United States Patent
Michimori et al.

(10) Patent No.: US 6,625,104 B2
(45) Date of Patent: Sep. 23, 2003

(54) DRIVE FORCE-TRANSMITTING MECHANISM

(75) Inventors: Atsushi Michimori, Tokyo (JP); Masaaki Takeshima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 49 days.

(21) Appl. No.: 09/944,181

(22) Filed: Sep. 4, 2001

(65) Prior Publication Data

US 2002/0027866 A1 Mar. 7, 2002

(30) Foreign Application Priority Data

Sep. 7, 2000 (JP) .......................................... 2000-271341

(51) Int. Cl.$^7$ ............................................... G11B 21/02
(52) U.S. Cl. ..................... 369/215; 369/77.1; 369/77.2; 369/75.1; 369/75.2; 369/219; 369/222
(58) Field of Search ................................. 369/219, 222, 369/75.1, 75.2, 215, 77.1, 249, 266, 30.88

(56) References Cited

U.S. PATENT DOCUMENTS 5,119,357 A  *  6/1992  Tsuruta et al. ............. 369/75.2
5,144,612 A  *  9/1992  Isobe et al. ................. 369/77.1
5,172,361 A  * 12/1992  Urushibata et al. ........ 369/77.1

FOREIGN PATENT DOCUMENTS

JP         A11219555       8/1999

* cited by examiner

Primary Examiner—David L. Ometz
Assistant Examiner—Mark Blouin
(74) Attorney, Agent, or Firm—Birch, Stewart, Kolasch & Birch, LLP

(57) ABSTRACT

A drive-force transmitting mechanism includes a drive disk and a driven disk that are rotatable about an axis. The driven disk has two diametrically opposing engagement portions. The drive disk has two levers pivotally mounted thereon, each lever having a clutch pin formed thereon. The two disks are disposed so that the levers are sandwiched between the two disks. The levers are operatively coupled through a coupling member such that rotation of one lever is transmitted to the other. A cam member has a groove that guides a pin member of one lever such that when the drive disk rotates through a first angle, the pins move toward the axis to engage the engagement portions to transmit rotation of the drive disk to the driven disk, and when the drive disk rotates through another angle, the pins move away from the axis to disengage from the engagement portions.

7 Claims, 11 Drawing Sheets

DRIVE FORCE-TRANSMITTING MECHANISM

BACKGROUND OF THE INVENTION

1. Field of the Invention

The present invention relates to a drive-force transmitting mechanism that is used for switching operation modes of apparatus such as a compact disk (CD) play-back apparatus and a VTR, and more particularly to a drive-force transmitting mechanism that permits and does not permit transmission of a torque at a predetermined timing.

2. Description of the Related Art

FIG. 11 illustrates a conventional drive-force transmitting mechanism, and particularly a pertinent portion of a cassette loading apparatus disclosed in Laid-open Japanese Patent (KOKAI) No. 11-219555.

A cam gear 102 is journaled on a chassis 101 and is in mesh with a worm gear 105. The rotation of a motor 103 is transmitted through a belt 104 to the worm gear 105, which in turn drives the cam gear 102 in rotation.

A capstan motor 106 generates a torque, which is transmitted through a pulley 109 and a belt 107 to a gear pulley 108. A lever 110 is pivotally supported on the chassis 101 at a pivot shaft 110c. The lever 110 has a cam pin 110a formed at a midway point of the lever 110 and a pin 110b formed at a free end thereof. The cam pin 110a engages a cam groove 102a formed in the cam gear 102.

A slide plate 111 is formed with a cutout 111a therein that receives the pin 110b and is slidably supported on the chassis 101. When the lever 110 is driven by the cam gear 102 to pivot about the pivot shaft 110c, the pin 110b causes the slide plate 111 to move back and forth in the X direction. The slide plate 111 is formed with a cam surface 111b on one longitudinal end thereof.

A lever 113 is rotatably supported at a midway point thereof on the chassis 101 and rotates relative to the chassis 101 about a pivot shaft 113a. The lever 113 has one longitudinal end thereof connected to a tension spring 115 and the other end rotatably supported on a gear pulley 114. The lever 113 also has a pin 113b provided thereon between the spring 115 and the pivot shaft 113a. The spring 115 urges the pin 113b against the cam surface 111b counterclockwise.

A belt 118 is entrained about the gear pulley 114 and an intermediate gear 116. The intermediate gear 116 is in mesh with a drive gear 117 that is rotatably mounted on the chassis 101. The rotation of the gear pulley 114 is transmitted through the intermediate gear 116 to the drive gear 117. The drive gear 117 drives a cassette loading mechanism, not shown.

The operation of the conventional clutch of the aforementioned constriction will be described.

When a user inserts a cassette 120 into the apparatus, a detection switch, not shown, detects the cassette 120 and then the drive motor 103 runs to rotate the cam gear 102 to bring the apparatus into a predetermined mode of operation. As the cam gear 102 rotates, the lever 110 pivots counterclockwise, causing the slide plate 111 to move in the X direction away from the origin O. Thus, the pin 113b is guided on the cam surface 111b to rotate counterclockwise so that the gear pulley 114 moves into meshing engagement with the gear pulley 108.

Then, the capstan motor 106 starts to rotate. The rotation of the capstan motor 106 is transmitted through the gear pulleys 108 and 114, belt 118, intermediate gear 116, to the drive gear 117. The drive gear 117 drives the cassette-loading mechanism to pull in the cassette 120 into the apparatus, thereby placing the cassette 120 on the reels 121 and 122.

The detection switch, not shown, detects when the loading operation is completed, and the capstan motor 106 stops rotating and the drive motor 103 rotates in the reverse direction. Thus, the slide plate 111 is moved in the X direction toward the origin O, so that the gear pulley 114 moves out of meshing engagement with the gear pulley 108. Then, a tape loading mechanism, not shown, draws out the tape from the cassette 120 and loads it onto a rotary drum, not shown. The capstan motor 106 then rotates to run the tape for the reproduction operation.

FIG. 12 illustrates another conventional clutch mechanism, a commonly used geneva mechanism.

Referring to FIG. 12, a drive gear 151 has a gear portion 151a and a non-gear circumferential portion 151b having a smooth circumferential surface. A driven gear 152 has gear portions 152a and fish-tail-shaped portions 152b, the gear portion 152a and the fish-tail-shaped portion 151b being arranged alternately. The gear portion 151a meshes with the gear portion 151a.

When the gear portion 151a is in mesh with the gear portion 151a, the driven gear 152 rotates so that the rotation of the drive gear 151 is transmitted to the driven gear 152. When the non-gear circumferential portion 151b moves into contact engagement with the fish-tail-shaped portion 151b, the rotation of the drive gear 151 is not transmitted to the driven gear 152. As the drive gear 151 further rotates, the gear portion 151a again moves into meshing engagement with the gear portion 151a so that the rotation of the drive gear 151 is transmitted to the driven gear 152. In this manner, the continuous rotation of the drive gear 151 is transmitted intermittently to the driven gear 152.

The drive-force transmitting mechanism disclosed by Laid-open Japanese Patent (KOKAI) No. 11-219555 suffers from the problem that the drive motor 103 is required as a drive source that drives the clutch to engage and disengage. The need for such a drive source leads to an increase in cost.

The drive-force is transmitted or not transmitted by bringing the gears into or out of meshing engagement with each other, respectively. When the gears are rotating, the gears are not only smoothly brought into or out of meshing engagement but the gear teeth may be damaged.

The geneva mechanism requires no special drive source for engaging and disengaging the gears. However, the gears must be closely located to each other so that they move into and out of meshing engagement with each other as the drive gear rotates. In other words, the drive gear cannot be disposed away from the driven gear. Thus, the geneva mechanism is not practical in a case where the relative distance between the drive side and the driven side changes depending on whether the clutch is engaged or disengaged.

SUMMARY OF THE INVENTION

An object of the invention is to provide a drive-force transmitting mechanism that requires no drive source such as a motor for driving the clutch to engage and disengage.

Another object of the invention is to provide a drive-force transmitting mechanism that transmits a drive force irrespective of whether the relative distance between the drive side and the driven side changes depending on the engagement state of the drive-force transmitting mechanism.

A drive-force transmitting mechanism engages to transmit the rotation of a first disk to the second disk and disengages not to transmit the rotation. A first disk is rotatable about an axis. A second disk is rotatable about the axis and has a first engagement member formed thereon. A second engagement member is mounted on the first disk such that the second engagement member is sandwiched between the first disk and the second disk, the second engagement member being movable toward the axis or away from the axis. A guide member guides the second engagement member such that the second engagement member moves radially toward the axis or away from the axis depending on a direction in which the first disk rotates about the axis. When the second engagement member engages the first engagement member, rotation of the first disk is transmitted to the second disk. When the second engagement member disengages from the first engagement member, rotation of the first disk is not transmitted to the second disk.

When the first disk rotates in a first direction through a first angle range, the guide member guides the second engagement member to move radially toward the axis so that the second engagement member engages the first engagement member. When the first disk rotates in a second direction opposite to the first direction through a second angle range subsequent to the first angle range, the first disk and the second disk rotate together so that rotation of the first disk is transmitted to the second disk. When the first disk rotates in the first direction through a third angle range subsequent to the second angle range, the second engagement member disengages from the first engagement member so that rotation of the first disk is not transmitted to the second disk.

The guide member has a cam groove formed therein and the second engagement member has a guide pin that engages the cam groove, the guide pin being guided along the cam groove when the first disk rotates about the axis.

The guide pin is pivotal about a position on a radius of the first disk. The cam groove has a first arcuate groove having a large diameter, a second arcuate groove having a medium diameter, a third arcuate groove having a small diameter, a first radially extending groove that connects the first arcuate groove and the second arcuate groove together, and a second radially extending groove that connects the second arcuate groove and the third arcuate groove together.

The engagement member is one of two engagement members disposed on the first disk and diametrically opposite with respect to the axis. The drive-force transmitting mechanism further comprises a coupling member that engages the two engagement members to transmit movement of one of the two engagement members to the other of the two engagement members such that the two engagement members operatively move toward and away from the axis.

One of the two engagement members is mounted on a first lever that is pivotally mounted to the first disk and the other of the engagement members is mounted on a second lever that is pivotally mounted to the first disk.

The coupling member is pivotal about the axis and pivotally engages the first lever and the second lever.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

The present invention will be described in detail by way of example.

First Embodiment

Construction

Figure 1:
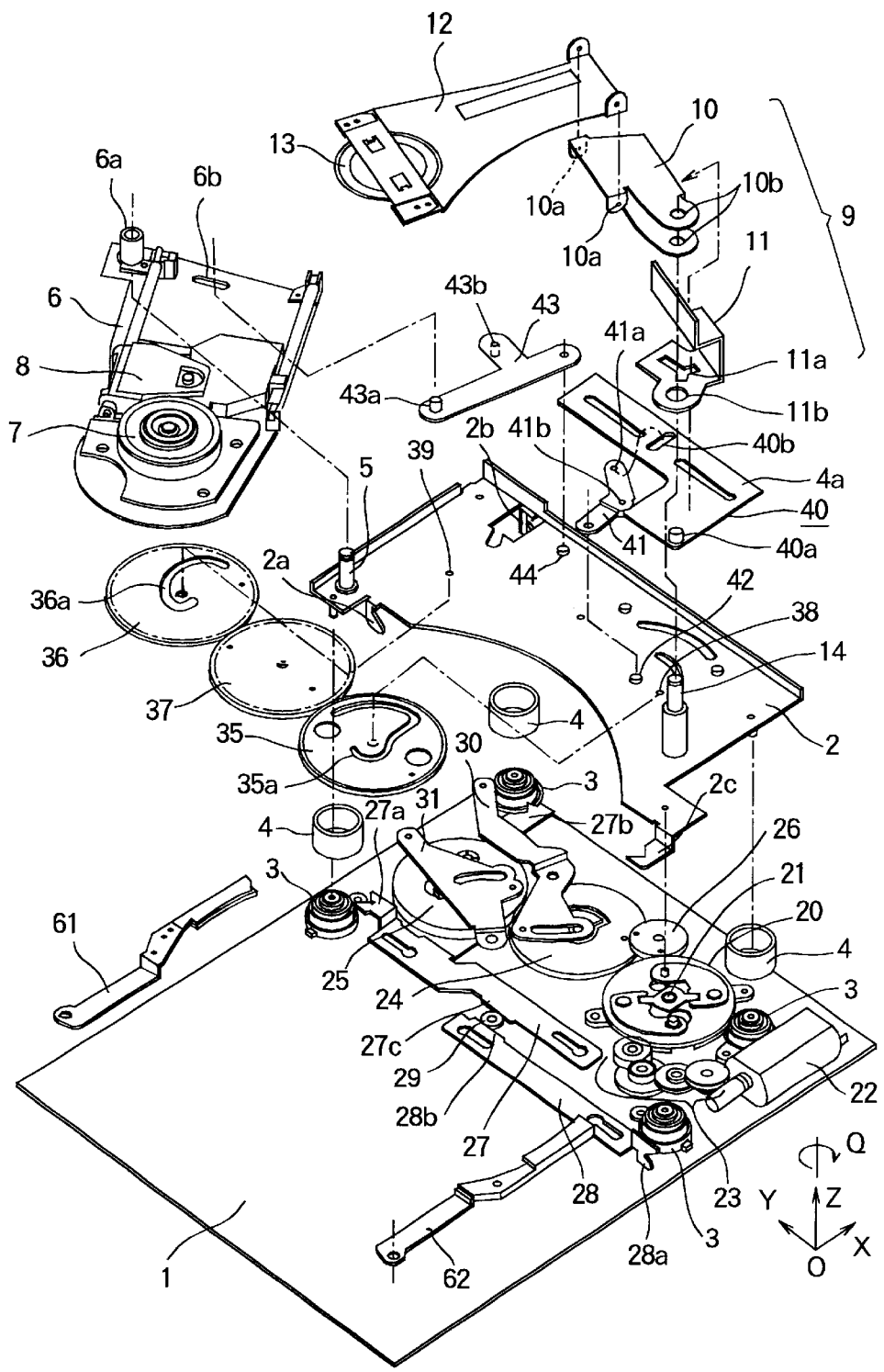
FIG. 1 is an exploded perspective view of a disk changer that employs a drive-force transmitting mechanism according to a first embodiment of the present invention.

FIG. 1 is an exploded perspective view of a disk changer that employs a drive-force transmitting mechanism according to a first embodiment of the present invention.

Referring to FIG. 1, a chassis 1 carries a deck base 2 thereon that is floated on dampers 3 and springs 4. The deck base 2 has an upright shaft 5 that loosely extends through a hole 6a formed in a base 6 so that the base 6 is rotatable relative to the deck base 2. The base 6 supports a pickup 8 and a turntable 7 that rotates with a disk placed thereon.

A clamp base 9 includes a clamp holder 10 and a cam plate 11 that are assembled in unitary construction. The cam plate 11 is formed with a cam groove 11a therein. The clamp holder 10 has a pair of holes 10a and 10a and a clamper arm 12 has another pair of holes. A pin, not shown, is inserted through the pairs of holes such that the damper arm 12 can pivot about the pin with respect to the clamp holder 10. An upright shaft 14 loosely extends through the holes 10b and 11b so that the clamp base 9 is rotatable relative to the deck base 2.

A clutch gear 20, which will be described later, is rotatably supported on an upright shaft 21 and serves as a drive disk member. The clutch gear 20 has gear teeth formed in its circumferential surface and is driven in rotation by an intermediate gear train 23. The gear train 23 transmits the rotation of the drive motor 22 mounted on the chassis 1 to the gear teeth. A first cam gear 24 and a second cam gears 25 are in mesh with each other and are rotatably supported on the chassis 1. An intermediate gear 26 transmits the rotation of the clutch gear 20 to the first and second cam gear 24 and 25.

A first locking plate 27 is substantially L-shaped and supported on the chassis 1 such that the first locking plate 27 can slide back and forth on the chassis 1 in the Y direction. The first locking plate 27 has locking lugs 27a and 27b that engage projections 2a and 2b, respectively, at a later described timing to lock the deck base 2. The locking plate 27 engages a cam groove, not shown, formed in the underside of a second cam gear 25.

A second locking plate 28 is supported on the chassis 1 such that the second locking plate 28 can slide back and forth on the chassis 1 in the Y direction. The second locking plate 28 has a locking lug 28a that engages a projection 2c of the deck base 2 to lock the deck base 2. The first and second locking plates 27 and 28 are formed with racks 27c and 28b therein, respectively, which are in mesh with a gear 29 disposed between the first and second locking plates 27 and 28. The gear 29 serves to transmit the movement of the first locking plate 27 to the second locking plate 28 in such a way that the two locking plates move in parallel but in opposite directions.

A first cam lever 30 engages the first cam gear 24 and a second cam lever 31 engages the second cam gear 25.

A third cam gear 35 serves as a driven disk having a cam groove 35a formed therein. The third cam gear 35 is rotatably supported on a shaft 38 that extends downward from the underside of the deck base 2. The shaft 38 extends in the Z direction and is in line with the shaft 21 of the clutch gear 20. Likewise, a fourth cam gear 36 is formed with a cam groove 36a therein and is rotatably supported on a shaft 39 that extends downward from the underside of the deck base 2. An idle gear 37 is disposed on the underside of the deck base 2 and is in mesh with both the third cam gear 35 and the fourth cam gear 36 to operatively couple the two gears 35 and 36.

Figure 5A:
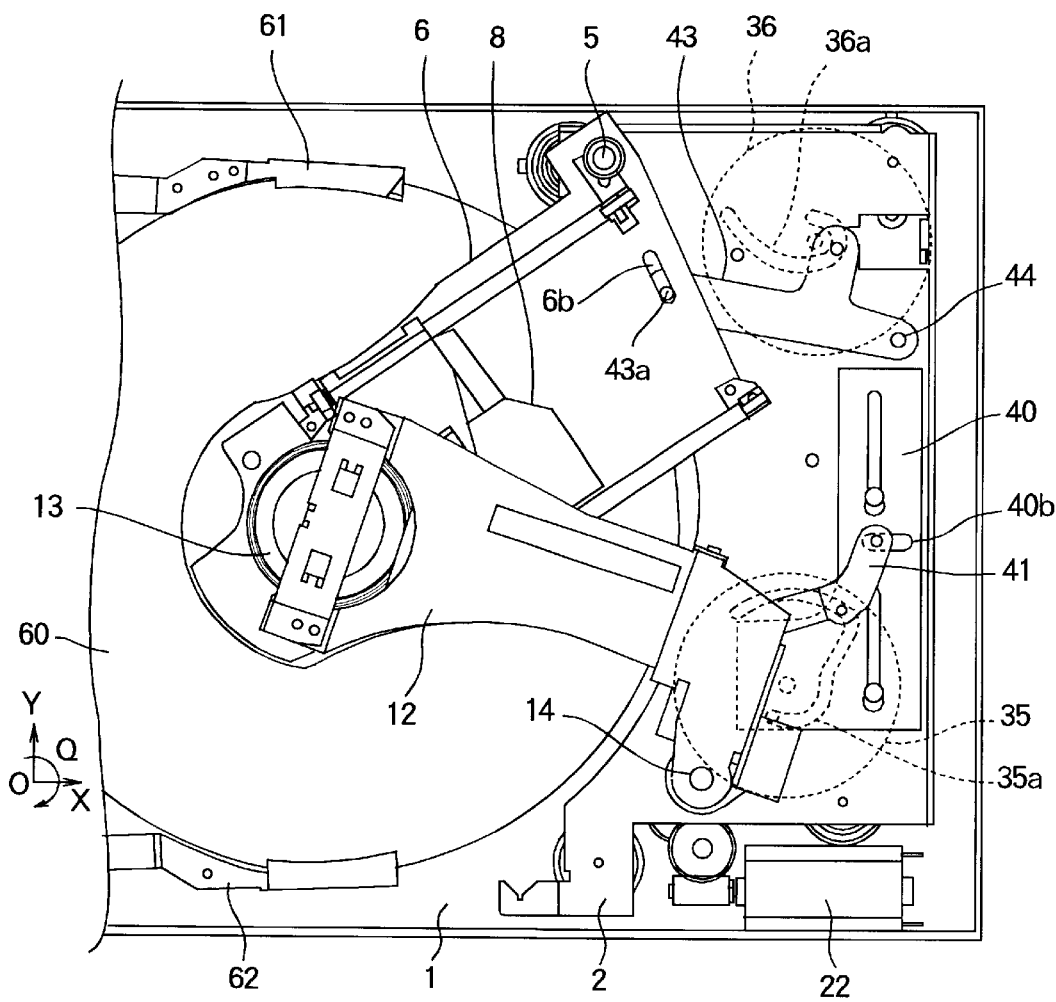

A drive plate 40 is supported on the deck base 2 and is slidable in the Y direction. The drive plate 40 has an engagement pin 40a that engages the cam groove 11a formed in the cam plate 11. A lever 41 has one end thereof rotatably supported on a shaft 42 and the other end from which an engagement pin 41a depends. The engagement pin 41a engages an elongated hole formed in the drive plate 40 (FIG. 5A). The lever 41 also has an engagement pin 41b that depends from a midway portion of the lever 41. The engagement pin 41b engages a cam groove 35a formed in the third cam gear 35.

A lever 43 has one end thereof supported on a shaft 44 that projects upward from the deck base 2, and the other end thereof from which an engagement pin 43a projects upward. The engagement pin 43a engages an elongated hole 6b formed in the base 6. The lever 43 also has an engagement pin 43b that depends downward from a midway portion of the lever 43. The engagement pin 43b engages the cam groove 36a formed in the fourth cam gear 36 disposed under the deck base 2.

Figure 2:
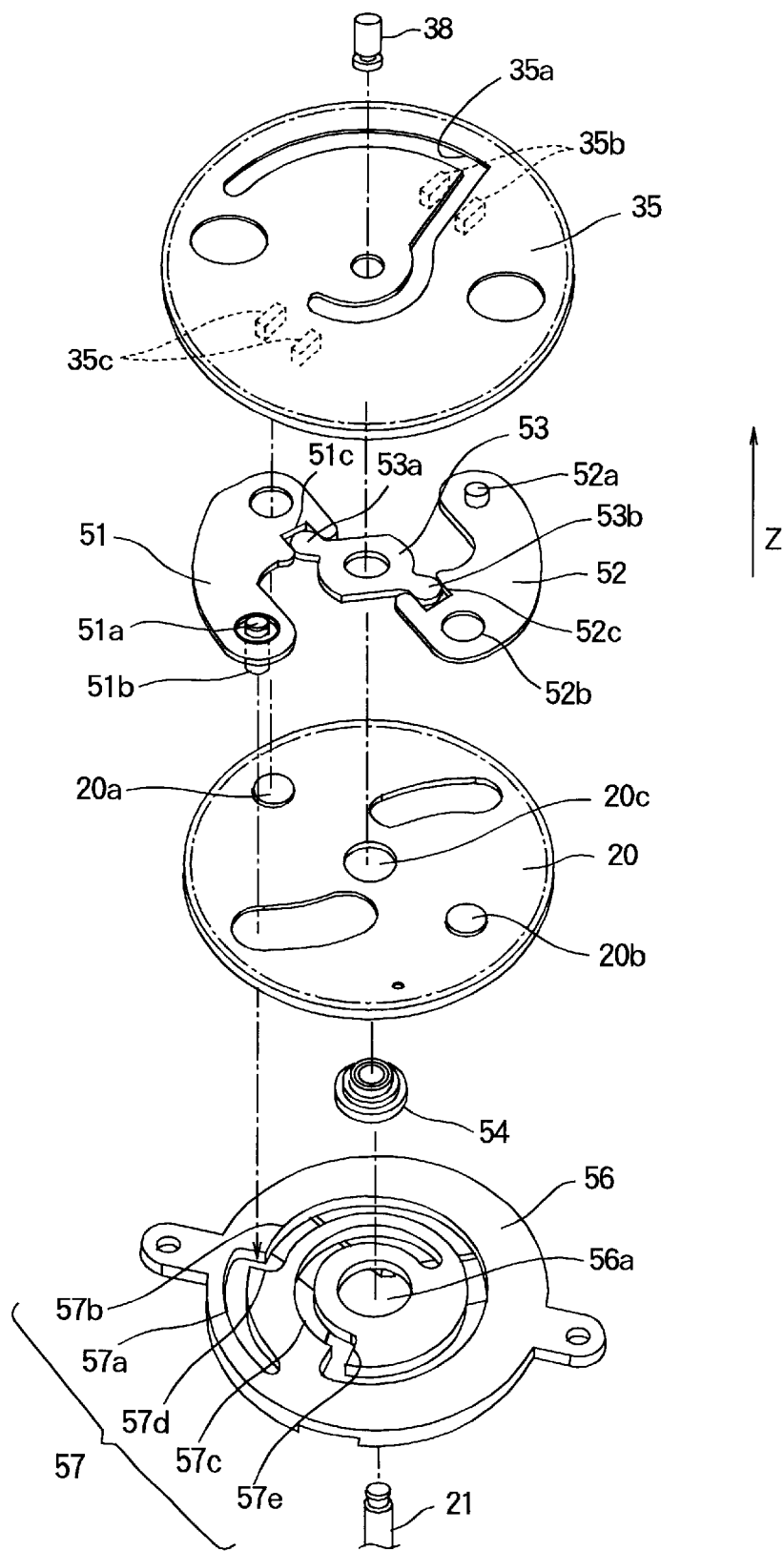
FIG. 2 is an exploded perspective view of the force-transmitting mechanism.

FIG. 2 is an exploded perspective view of the force-transmitting mechanism or clutch mechanism of the invention.

The configuration of a clutch mechanism including the clutch gear 20 will be described with reference to FIG. 2.

Referring to FIG. 2, the clutch gear 20 is rotatably supported on the shaft 21 that projects upward from the chassis 1 (FIG. 1) and has a pair of short shafts 20a and 20b formed at diametrically opposing positions with respect to a center hole 20c. A first clutch lever 51 is rotatably supported at one end thereof on the shaft 20a and has a clutch pin 51a and a guide pin 51b at the other end thereof. The clutch pin 51a projects upward and the guide pin 51b projects downward. The clutch pin 51a and guide pin 51b are in line with each other in the Z direction. The second clutch lever 52 has one end thereof rotatably supported on the shaft 20b and the other end at which a clutch pin 52a projects upward.

A coupling lever 53 is rotatably supported on a bush 54 that fits over the shaft 21, and rotates about the same axis as the clutch gear 20. The coupling lever 53 has diametrically opposing projections 53a and 53b. The projection 53a is received in a cutout 51c of the first clutch lever 51 and the projection 53b is received in a cutout 52b of the second clutch lever 52.

The shaft 38 projects downward from the underside of the deck base 2 and is in line with the shaft 21 in the Z direction (FIG. 1). The third cam gear 35 is rotatably supported on the shaft 38. The third cam gear 35 is formed with two pairs of projections on an underside thereof; a pair of projections 35b and another pair of projections 35c. The two pairs of projections 35b and 35c are diametrically opposing and each of the two pairs includes two parallel short projections spaced apart. The projections 35b and 35c extend radially so that the clutch pins 51a and 52a move into the spaces between the two parallel projections 35b and 35c.

A guide member 56 is disposed under the clutch gear 20 such that the guide member 56 is coaxial with the shaft 21, and is fixed to the base 1 (FIG. 1). The guide member 56 is formed with a guide groove 57 therein that guides the guide pin 51b depending from the first clutch lever 51.

Figure 3:
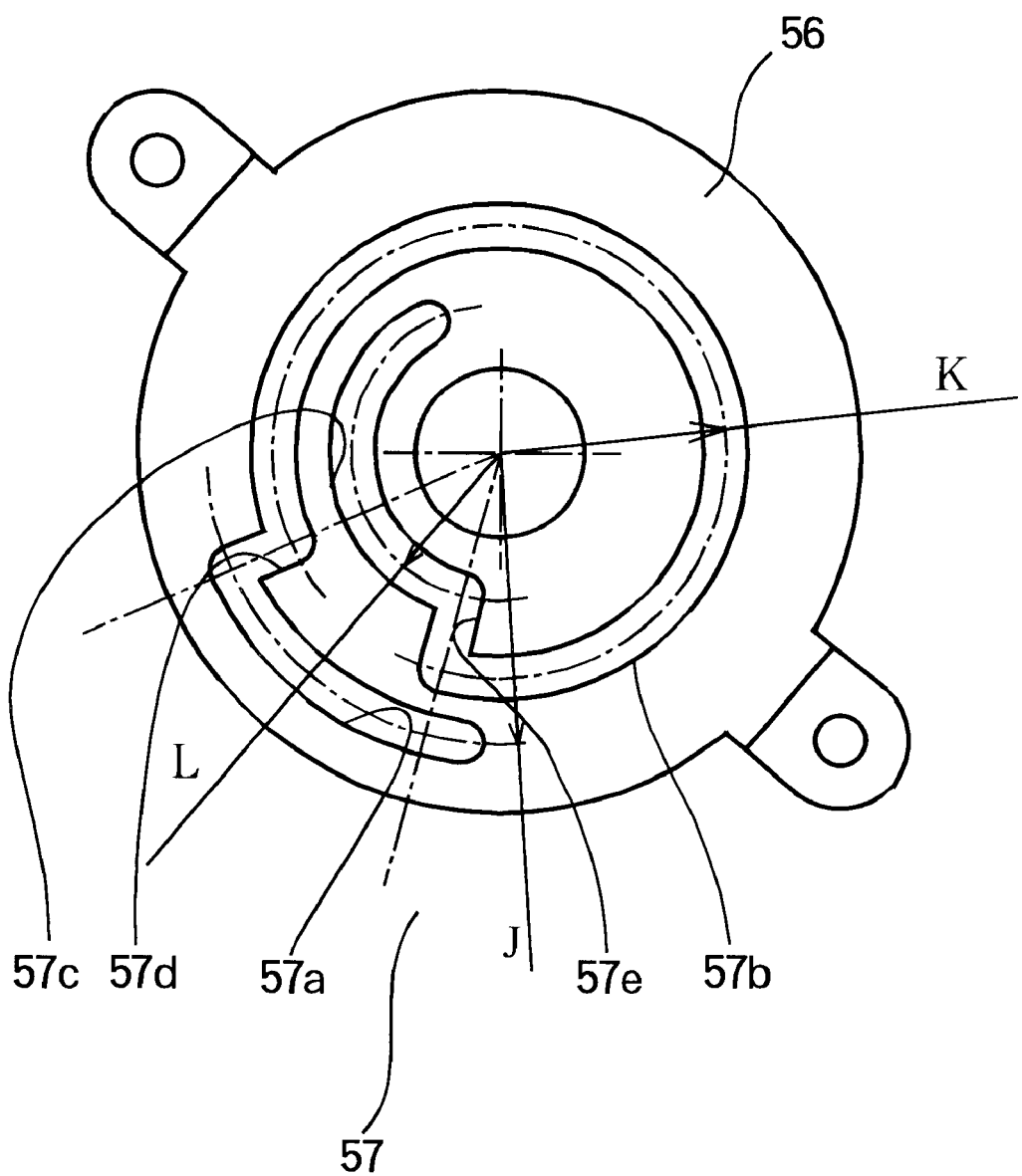
FIG. 3 is a top view of the guide member 56 illustrating the shape of the guide groove 57.

FIG. 3 is a top view of the guide member 56 illustrating the shape of the guide groove 57.

The guide groove 57 includes a first groove 57a in the shape of an arc with a radius J, a second groove 57b in the shape of an arc with a radius K, and a third groove 57c in the shape of an arc with a radius L. The guide groove 57 further includes a fourth groove 57d that extends radially to connect the first groove 57a and the second groove 57b, and a fifth groove 57e that extends radially to connect the second groove 57b and the third groove 57c.

Operation

The operation of a disk changer of the aforementioned construction will be described with reference to FIGS. 4A–6B.

Figure 4A:
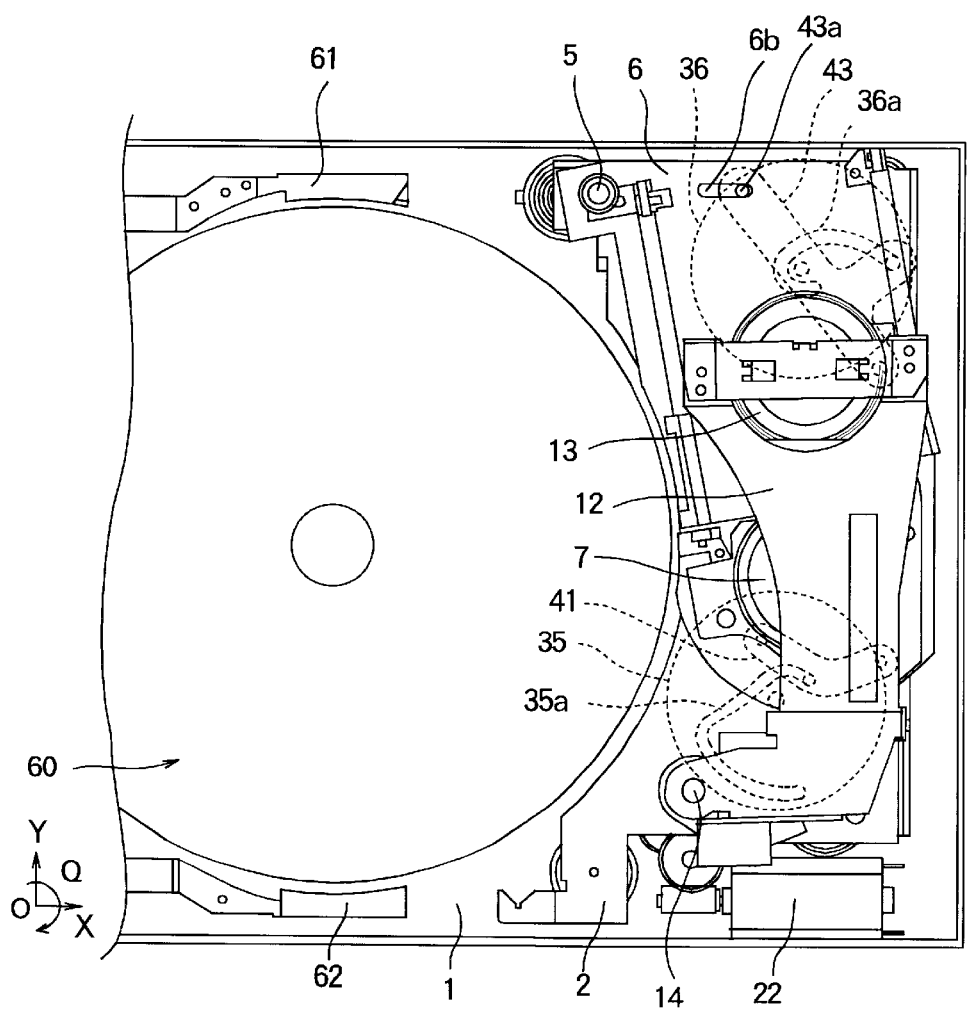
FIGS. 4A, 5A, and 6A are top views illustrating the operation of the base 6 and clamper arm 12 of the disk changer at the respective timings.
Figure 6A:
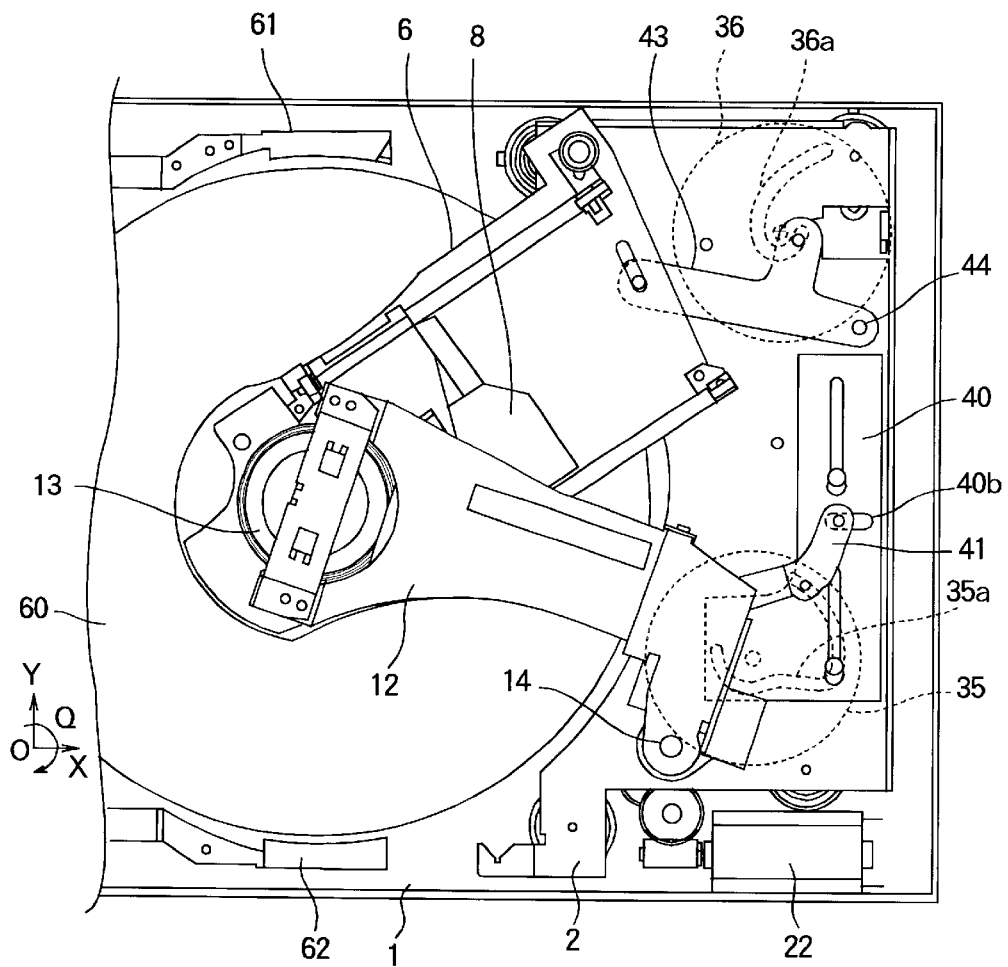

FIGS. 4A, 5A, and 6A are top views illustrating the operation of the base 6 and lamper arm 12 of the disk changer at the respective timings.

Figure 4B:
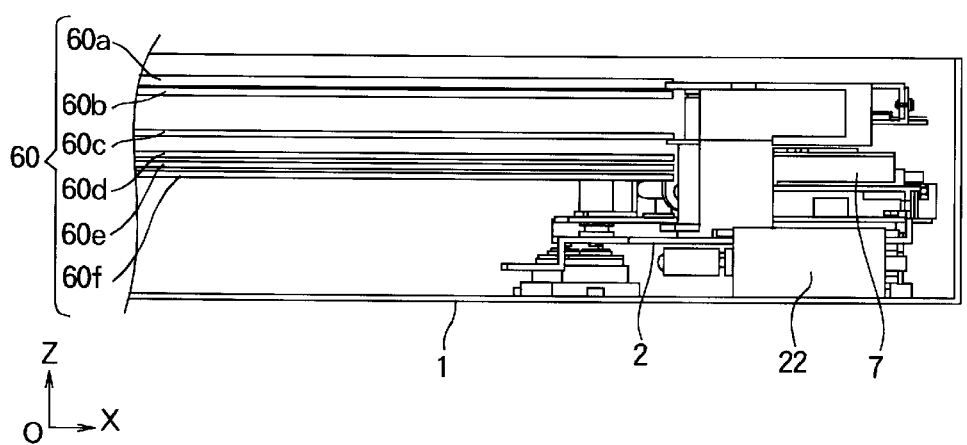
FIGS. 4B, 5B, and 6B are side views illustrating the operation of the base 6 and clamper arm 12 of the disk changer at the respective timings.
Figure 5B:
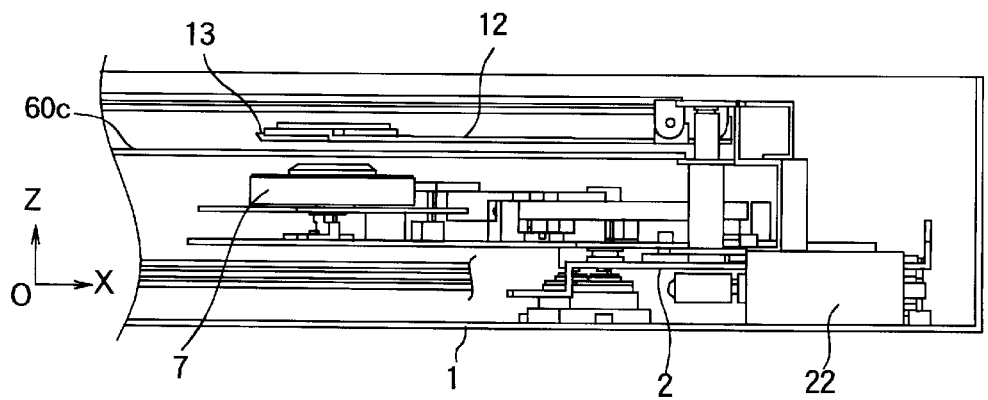
Figure 6B:
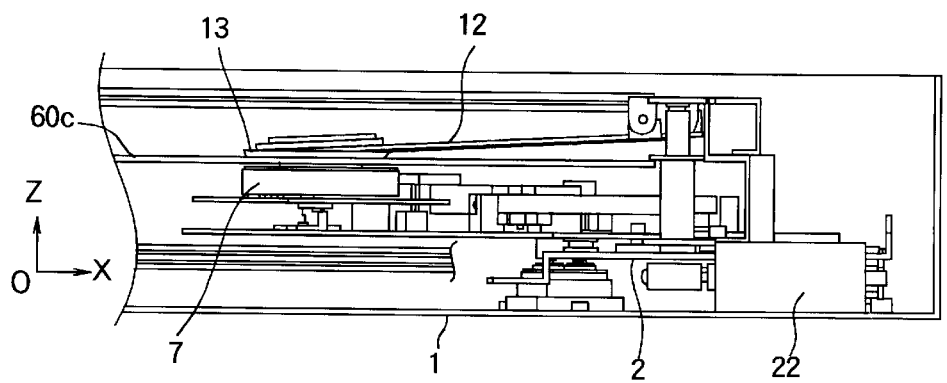

FIGS. 4B, 5B, and 6B are side views illustrating the operation of the base 6 and clamper arm 12 of the disk changer at the respective timings.

FIGS. 7A–7F are illustrative diagrams illustrating the operation of the clutch mechanism at the respective timings.

Referring to FIGS. 4A–5B, a stack 60 of disk includes six disks 60a–60f that are held in line with one another by means of a supporting member, not shown, of the disk changer.

FIGS. 4A and 4B illustrate an initial state of the disk changer where the base 6 and the damper arm 12 have moved out of an area that is occupied by the stack 60 of disks. At this moment, the deck base 2 is fixed to the base 1 with the projections 2a, 2b, and 2c (FIG. 1) engaging the locking lugs 27a, 27b, and 28a (FIG. 1).

The playing operation starts from this state.

Figure 7A:
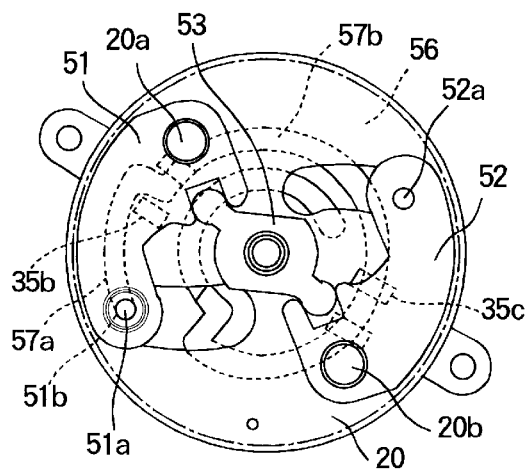
FIGS. 7A–7F are illustrative diagrams illustrating the operation of the clutch mechanism at the respective timings.
Figure 7B:
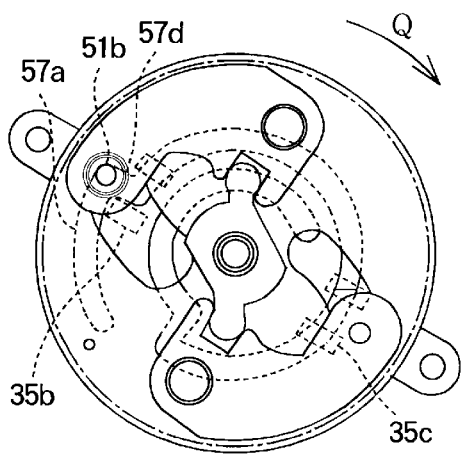

FIG. 7A illustrates an initial state of the clutch mechanism before the clutch gear 20 rotates in a direction shown by arrow Q.

The guide pin 51b is positioned at a starting point of the first groove 57a formed in the guide member 56. First, the drive motor 22 starts to rotate to drive the clutch gear 20 into rotation in the Q direction through the intermediate gear train 23 (FIG. 1). When the clutch gear 20 rotates in the Q direction, the guide pin 51b moves along the first groove 57a to reach an ending point of the first groove 57a. This path of the guide pin 51b is referred to as a first operation section in this specification.

The movement of the clutch gear 20 in the first operation section is transmitted through the intermediate gear 26 to the first cam gear 24 and the second cam gear 25. As the first and second cam gears 24 and 25 rotate, the first and second cam levers 30 and 31 pivot, following their predetermined paths, respectively, so as to drive corresponding various mechanisms, not shown, to perform the following operations.

That is, the first and second cam levers 30 and 31 cause a pair of disk holders 61 and 62 to hold, for example, the third disk 60c in a sandwiched fashion, the disk 60c being selected from among the stack 60 of disks (FIGS. 4A and 4B). The pair of disk holders 61 and 62 are located at both sides of the base 1. Then, the motion of the first and second cam levers 30 and 31 divides the stack 60 of disks into two groups, creating a space therebetween into which the base 6 enters as shown in FIG. 5B. When the clutch gear 20 as a drive disk rotates so that the guide pin 51b moves in the first operation section, the rotation of the clutch gear 20 is not transmitted to the third cam gear 35 as a driven disk.

Figure 7C:
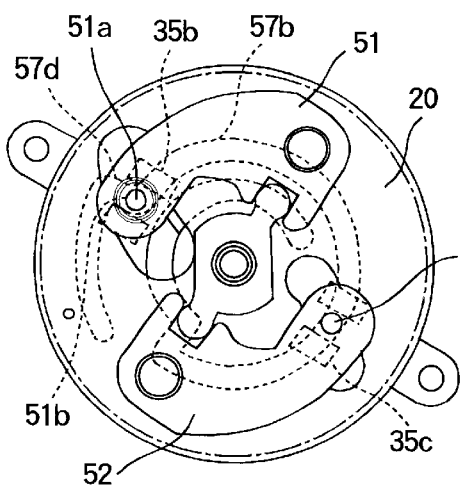
Figure 7D:
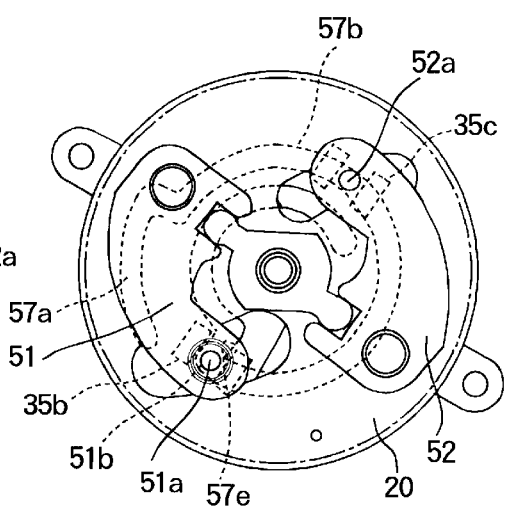
Figure 7E:
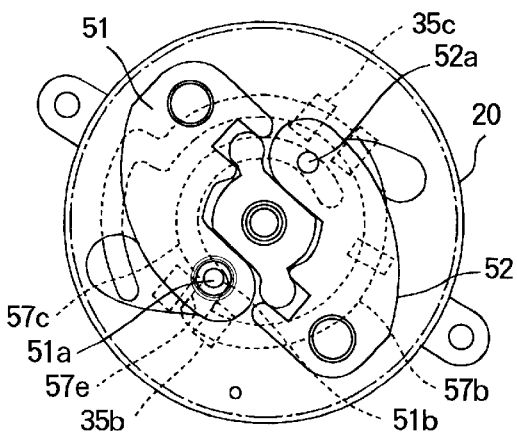

When the guide pin 51b has reached the ending point the first operation section and then the clutch gear 20 rotates in a direction opposite to the Q direction, the guide pin 51b moves through the fourth groove 57d of FIG. 7C to reach a starting point of the arcuate second groove 57b. This path of the guide pin 51b is referred to as a second operation section in this specification.

Figure 8:
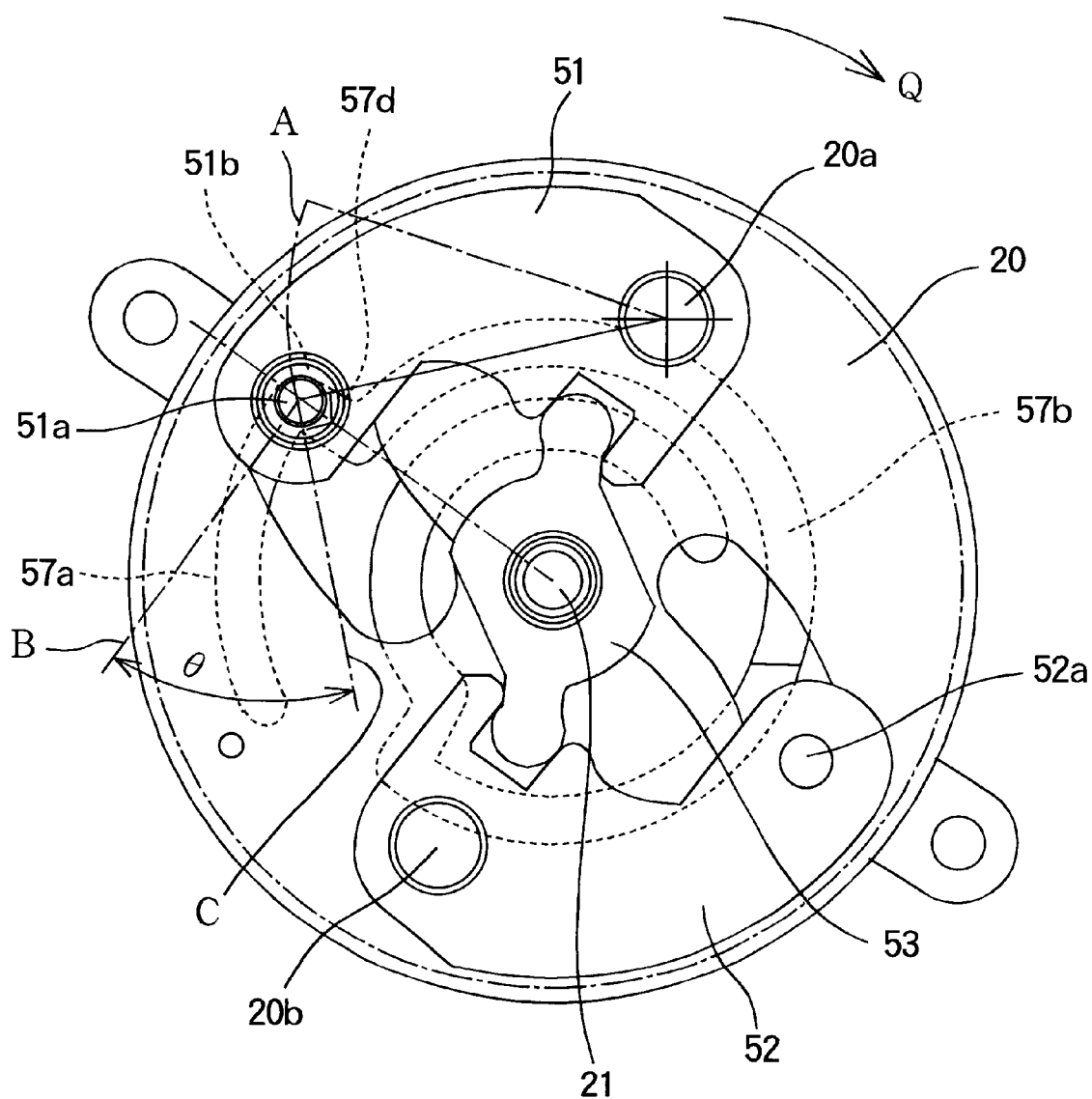
FIG. 8 illustrates the operation of the guide pin 51b in the second operation section.

FIG. 8 illustrates, by way of example, the operation of the guide pin 51b in the second operation section.

The operation of the guide pin 51b when it is in the second operation section will be described with reference to FIG. 8.

The guide pin 51b is movable along an arcuate path A about the shaft 20a. The fourth groove 57d extends in a direction of radius of the clutch gear 20. A line B normal to the radius of the clutch gear 20 makes an angle θ with a line C tangent to the arcuate path A. This angle θ is selected to be about 45°. Thus, when the clutch gear 20 rotates in a direction opposite to the Q direction, the guide pin 51b moves in the fourth groove 57d to be smoothly guided into the second groove 57b.

When the first clutch lever 51 is guided in the fourth groove 57d toward the center of the guide member 56, the motion of the first clutch lever 51 is transmitted through the coupling lever 53 to the second clutch lever 52. Thus, both the clutch pins 51a and 52a (FIG. 7C) move closer to each other toward the center of the guide member 56, entering spaces between the projections 35b and 35c (FIG. 1), respectively on the third cam gear 35. The movement of the clutch pins 51a and 52a into the spaces between the projections 35b and 35c allows the clutch gear 20 and the third cam gear 35 to engage with each other, thereby directly transmitting the rotation of the clutch gear 20 to the third cam gear 35.

In the second operation section, the clutch pins 51a and 52a do not move in a circumferential path but in a radial path, allowing smooth movement of the clutch pins 51a and 52a into the spaces between the projections 35b and the projections 35c while the clutch gear 20 continues to rotate.

When the clutch gear 20 is further rotated in the Q direction after passing the second operation section, the guide pin 51b moves along the second groove 57b as shown in FIG. 7C, from the starting point of the second groove 57b to the ending point thereof. This path of the guide pin 51b is referred to as a third operation section in the specification. When the guide pin 51b is in the third operation section, the clutch gear 20 rotates in the Q direction. The rotation of the clutch gear 20 is directly transmitted to the third cam gear 35 through the clutch pin 51a engaged with the projections 35b and the clutch pin 52a engaged with the projections 35c, so that the third cam gear 35 rotates together with the clutch gear 20.

At this moment, the third cam gear 35 rotates in the Q direction, so that the lever 41 is guided in the cam groove 35a shown in FIGS. 4A and 5A to rotate in a direction opposite to the Q direction. As the lever 41 rotates, the drive plate 40 (FIG. 5A) moves in the Y direction, so that the clamper arm 12 rotates in the opposite direction to the Q direction due to the engagement of the pin 40a (FIG. 1) with the cam groove 11a (FIG. 1). Thus, the damper arm 12 extends from a retracted position to a reproducing position where a disk is played back.

The rotation of the third cam gear 35 is transmitted through the idle gear 37 to a fourth cam gear 36 so that the fourth cam gear 36 also rotates in the Q direction. At this moment, the lever 43 is guided in the cam groove 36a to rotate in the Q direction. Because the elongated hole 6b engages the engagement pin 43a that upwardly projects from the lever 43, the base 6 rotates in the Q direction from the retracted position to the reproducing position as the lever 43 rotates. The states of the respective components at this moment are shown in FIGS. 5A–5B.

When the third cam gear 35 is further rotated, a clamping mechanism, not shown, causes the clamper arm 12 to rotates downward so that the clamper 13 presses the disk 60c against the turntable 7 to rotatably hold the disk 60c on the turntable 7. The states of the respective components at this moment are shown in FIGS. 6A–6B After having passed the aforementioned third operation section, the clutch gear 20 reaches the starting end of the fifth groove 57e. This path (fifth groove 57e) of the guide pin 51b is referred to as a fourth operation section in this specification.

The operation of the guide pin 51b when it is in the fourth operation section will be described.

After the clutch gear 20 reaches the fourth operation section, the clutch gear 20 is rotated in the direction opposite to the Q direction. As a result, the first clutch lever 51 is guided in the fifth groove 57e toward the third groove 57c and the motion of the first clutch lever 51 is transmitted through the coupling lever 53 to the second clutch lever 52. Thus, both the clutch pins 51a and 52a (FIG. 7E) move closer to each other toward the center of the guide member 56, thereby moving out of engagement with the projections 35b and 35c, respectively. In this manner, the clutch gear 20 disengages from the third cam gear 35, the rotation of the clutch gear 20 being no longer transmitted to the third cam gear 35.

In the fourth operation section, the clutch pins 51a and 52a do not move in a circumferential path but in a radial path. This allows smooth movement of the clutch pins 51a and 52a out of the spaces between the projections 35b and 35c while the clutch gear 20 continues to rotate.

Figure 7F:
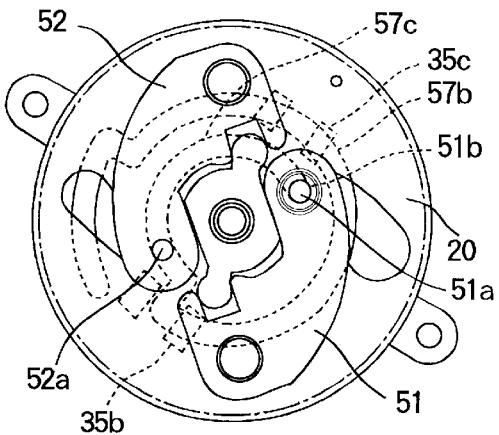

When the clutch gear 20 is further rotated in the Q direction passing the fourth operation section, the guide pin 51b moves along the second groove 57c, from the starting point of the second groove 57c to the ending point, as shown in FIG. 7F. This path of the guide pin 51b is referred to as a fifth operation section in this specification.

When the clutch gear 20 rotates in the Q direction in the fifth operation section, the rotation of the clutch gear 20 is transmitted to the first cam gear 24 and the second cam gear 25 through the intermediate gear 26 shown in FIG. 1. The rotation of the second cam gear 25 causes the first locking plate 27 and second locking plate 28 to move away from each other in the Y direction.

When the guide pin 51b finally arrives at the ending point of the third groove 57c shown in FIG. 7F, the drive motor 22 is turned off and subsequently the turntable is rotated to rotate the disk carried thereon. Then, the optical pickup 8 starts to reproduce the signal from the disk. The operation of returning the system to the initial state after completion of reproduction of the disk, the aforementioned series of operations will be simply reversed and the description thereof is omitted accordingly.

According to the disk changer of the first embodiment, a drive disk (i.e., clutch gear 20) can engage and disengage from a driven disk (i.e., the third cam gear 35) safely and reliably without having to stop the rotation of the clutch 20.

The projections 35b and 35c of the third cam gear 35 (driven disk) on the deck base 2 in a floating state are sufficiently spaced apart from the clutch pins 51a and 52a of the clutch gear 20 on the base 1 (drive disk). This construction allows for sufficient stroke of lifting the deck base 2.

The clutch pins 51a and 52a of the rotating clutch gear 20 are caused to move in directions of the radius of the third cam gear 35, thereby allowing the drive force to be coupled and de-coupled. This construction is advantageous in that the mechanical structure of a force-transmitting mechanism is simplified and a thin structure of a force-transmitting mechanism is implemented.

Second Embodiment

Figure 9:
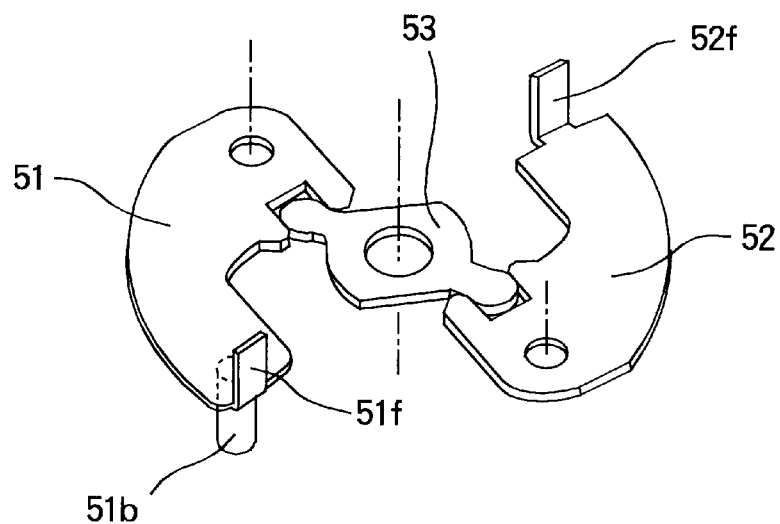
FIG. 9 is a perspective view of a clutch lever according to a second embodiment for use in a drive-force transmitting mechanism.

FIG. 9 is a perspective view of a clutch lever according to a second embodiment for use in a drive-force transmitting mechanism.

The clutch pins 51a and 52a of the first embodiment have been described with respect to pins that project upward from the first and second clutch levers 51 and 52, respectively. The clutch pins are not limited to the projections and may be in the form of folded portions 51f and 52f formed on the end of the respective clutch levers as shown in FIG. 9. In other words, the clutch pins can be of any configuration provided that the projections 35b and 35c can receive and release the clutch pins when the clutch pins move radially and then engage the clutch pins in locking engagement when the clutch pins move in a circumferential direction.

Third Embodiment

Figure 10:
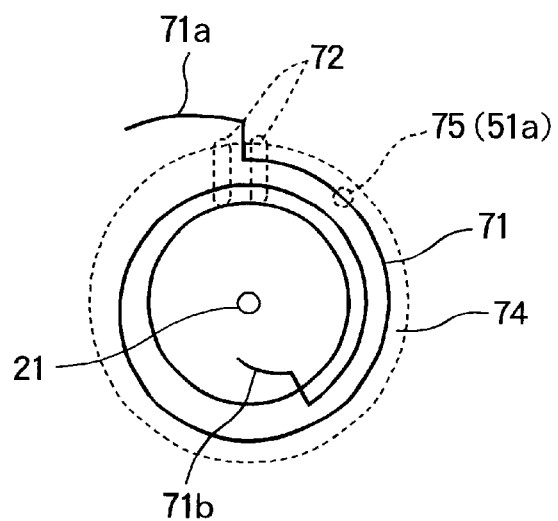
FIG. 10 is a model representation, illustrating a third embodiment of a drive-force transmitting mechanism according to the present invention.
Figure 11:
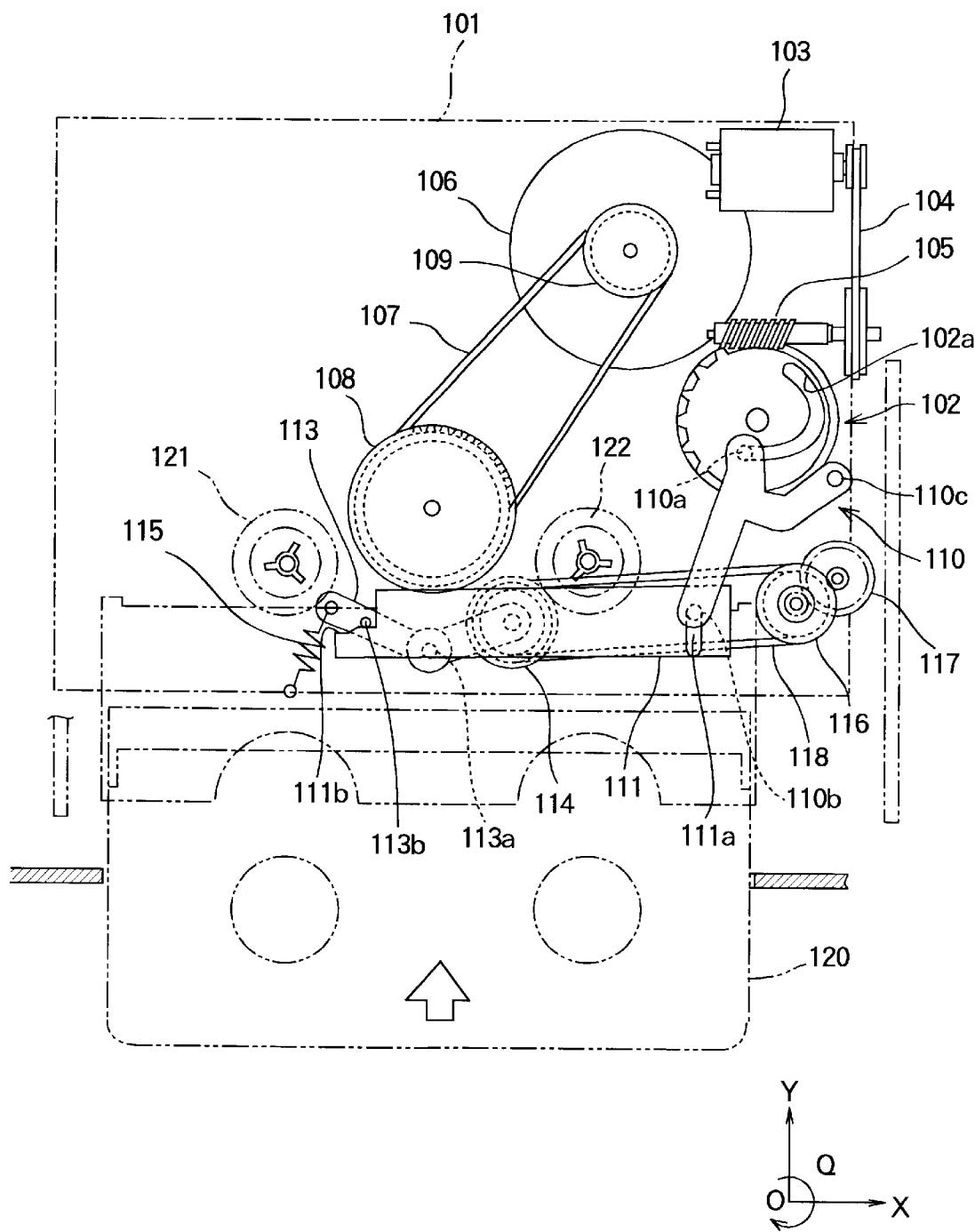
FIG. 11 illustrates a conventional drive-force transmitting mechanism, a pertinent portion of a cassette loading apparatus disclosed in Laid-open Japanese Patent (KOKAI) No. 11-219555.
Figure 12:
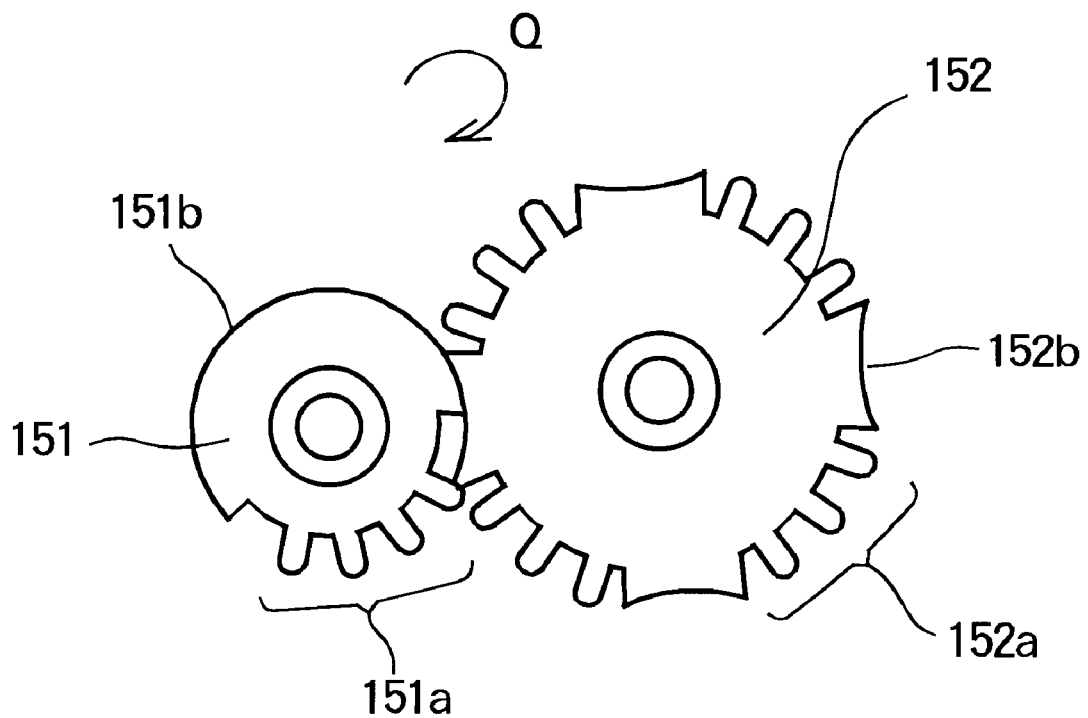
FIG. 12 illustrates another conventional clutch mechanism, a commonly used geneva mechanism.

FIG. 10 is a model representation, illustrating a third embodiment of a drive-force transmitting mechanism according to the present invention.

Referring to FIG. 10, reference numeral 71 denotes a center line of a guide groove formed in the guide member 56 (FIG. 2). Reference numeral 72 denotes the shape of engagement members corresponding to 35a and 35b formed on the third cam gear 35 (FIG. 2). Reference numeral 75 denotes a guide pin corresponding to 51a that projects downward from the first clutch lever 51 rotatably supported on the clutch gear 20 (FIG. 2) and moves in the guide groove. When the guide pin 75 is within an annular area defined by two dotted-line circles concentric to the shaft 21, the clutch pin 51a (FIG. 2) can engage the engagement members 72.

It is to be noted that the center line 71 of the guide groove spirals for more than one complete rotation. This configuration allows the third cam gear to make more than one complete rotation, thereby increasing a range of rotation in accordance with applications.

While the guide groove 57 according to the first embodiment includes arcuate grooves and radial straight grooves, the guide groove may include grooves 71a and 71b of other shapes than spiral and arc.

In the aforementioned embodiments, the clutch pins are formed on the clutch levers as a drive disk and the projections on the third cam gear as a driven disk. The configuration is not limited to this, but they can be interchanged in position, provided that they can engage and disengage from each other in a similar manner to the aforementioned embodiments.

In the aforementioned embodiments, the terms "downward" and "upward" are used for convenience, but these terms do not absolute positional relation of the structural elements.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A drive-force transmitting mechanism, comprising:

a first disk rotatable about an axis;

a second disk rotatable about the axis and having a first engagement member formed thereon;

a second engagement member mounted on said first disk such that said second engagement member is sandwiched between said first disk and said second disk, said second engagement member being movable toward the axis or away from the axis; and a guide member that guides said second engagement member such that said second engagement member moves radially toward the axis or away from the axis depending on a direction in which said first disk rotates about the axis; and wherein when said second engagement member engages the first engagement member, rotation of said first disk is transmitted to said second disk;

when said second engagement member disengages from the first engagement member, rotation of said first disk is not transmitted to said second disk.

2. The drive-force transmitting mechanism according to claim 1, wherein when said first disk rotates in a first direction through a first angle range, said guide member guides said second engagement member to move radially toward the axis so that said second engagement member engages the first engagement member;

when said first disk rotates in a second direction opposite to the first direction through a second angle range subsequent to the first angle range, said first disk and said second disk rotate together so that rotation of said first disk is transmitted to said second disk; and when said first disk rotates in the first direction through a third angle range subsequent to the second angle range, said second engagement member disengages from the first engagement member so that rotation of said first disk is not transmitted to said second disk.

3. The drive-force transmitting mechanism according to claim 1, wherein said guide member has a cam groove formed therein and said second engagement member has a guide pin that engages the cam groove, the guide pin being guided along the cam groove when said first disk rotates about the axis.

4. The drive-force transmitting mechanism according to claim 1, wherein said guide pin is pivotal about a position on a radius of said first disk; and wherein said cam groove has a first arcuate groove having a large diameter, a second arcuate groove having a medium diameter, a third arcuate groove having a small diameter, a first radially extending groove that connects the first arcuate groove and the second arcuate groove, and a second radially extending groove that connects the second arcuate groove and the third arcuate groove.

5. The drive-force transmitting mechanism according to claim 1, wherein said second engagement member is one of two second engagement members disposed on said first disk and diametrically opposite with respect to the axis;

wherein the drive-force transmitting mechanism further comprises a coupling member that engages the two second engagement members to transmit movement of one of the two second engagement members to the other of the two engagement members such that the two second engagement members operatively move toward and away from the axis.

6. The drive-force transmitting mechanism according to claim 5, wherein one of the two second engagement members is mounted on a first lever that is pivotally mounted to said first disk and the other of the two second engagement members is mounted on a second lever that is pivotally mounted to said first disk.

7. The drive-force transmitting mechanism according to claim 5, wherein said coupling member is pivotal about the axis and pivotally engages the first lever and the second lever.

* * * * *